US008265565B2

(12) United States Patent  
Dent

(10) Patent No.: US 8,265,565 B2  
(45) Date of Patent: Sep. 11, 2012

(54) COMMUNICATIONS SYSTEM EMPLOYING NON-POLLUTING PILOT CODES

(75) Inventor: Paul W. Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1295 days.

(21) Appl. No.: 11/671,624

(22) Filed: Feb. 6, 2007

(65) Prior Publication Data

US 2007/0127412 A1 Jun. 7, 2007

Related U.S. Application Data

(63) Continuation of application No. 09/915,895, filed on Jul. 26, 2001, now Pat. No. 7,224,942.

(51) Int. Cl.
*H04B 17/00* (2006.01)
(52) U.S. Cl. ............... 455/67.14; 455/67.11; 455/67.16; 455/63.1; 455/69; 455/500; 455/115.1; 455/450
(58) Field of Classification Search ............ 455/69, 455/63.1, 67.11, 67.13–67.16, 126, 43, 422.1; 370/203, 208, 241, 249, 324, 329; 375/267, 375/347
See application file for complete search history.

(56) References Cited

U.S. PATENT DOCUMENTS

| | | | | | |
|---|---|---|---|---|---|
| 5,898,929 | A | * | 4/1999 | Haartsen | 455/462 |
| 5,982,759 | A | * | 11/1999 | Jo et al. | 370/331 |
| 6,067,324 | A | * | 5/2000 | Harrison | 375/267 |
| 6,490,257 | B1 | * | 12/2002 | Watanabe et al. | 370/318 |
| 6,928,296 | B2 | * | 8/2005 | Kanemoto et al. | 455/522 |
| 6,996,194 | B2 | * | 2/2006 | Pukkila et al. | 375/340 |
| 6,996,375 | B2 | * | 2/2006 | Dent et al. | 455/67.16 |
| 7,123,600 | B2 | * | 10/2006 | Ozluturk et al. | 370/335 |
| 7,197,282 | B2 | * | 3/2007 | Dent et al. | 455/67.14 |
| 2002/0128026 | A1 | * | 9/2002 | Derryberry et al. | 455/504 |
| 2002/0181439 | A1 | * | 12/2002 | Orihashi et al. | 370/350 |

* cited by examiner

*Primary Examiner* — Willie J Daniel, Jr.
(74) *Attorney, Agent, or Firm* — Coats & Bennett, P.L.L.C.

(57) ABSTRACT

Transmitting non-polluting dummy pilot signals in a wireless communication network permits estimation of the downlink propagation channels between a number of joint transmitters and a lesser number of receivers. With fewer receivers than transmitters, loop back information from the receivers is not sufficient to determine the downlink propagation channels between the transmitters and receivers. For N transmitters and M receivers, (N–M) dummy pilot symbols are transmitted to facilitate downlink channel estimation. Each dummy pilot signal is transmitted to an imagined or dummy receiver that is virtually located such that its downlink channel coefficient vector is orthogonal to those of the real receivers. Transmit pre-filtering based on estimated propagation channels is applied to the information signals for the real receivers and to the dummy pilot signals. The extent to which the dummy pilot signals interfere at each receiver is an indication of mismatch between estimated and actual propagation channels.

18 Claims, 3 Drawing Sheets

COMMUNICATIONS SYSTEM EMPLOYING NON-POLLUTING PILOT CODES

This is a continuation of U.S. patent application Ser. No. 09/915,895, filed Jul. 26, 2001 and still pending, the disclosure of which is incorporated herein by reference.

BACKGROUND OF THE INVENTION

The present invention generally relates to wireless communication networks, and particularly relates to using non-polluting pilot codes in wireless networks employing coherent transmit diversity techniques that improve communication performance and efficiency.

Wireless communication networks employ various techniques to maximize their communication efficiency, performance, and economy. Economy and efficiency may be measured from the service provider's perspective, and generally relate to supporting the greatest possible number of users for lowest possible service and equipment costs. Performance may be measured from the perspective of both service providers and subscribers, and centers on providing the highest possible reliability at whatever data rate is being used.

Approaches to improving communication reliability are at least as numerous as the factors influencing that reliability. Thus, one sees a broad range of technologies and methods in modern communication systems, all meant to improve the underlying reliability of the communication services provided. Of these varied approaches, diversity communications itself represents a varied mix of techniques.

In wireless communication, successful reception depends on a relatively unobstructed signal path between a receiver and a supporting transmitter. If the path is obstructed, fading may occur. Fading may be particularly problematic when the wireless receiver is moving with respect to the transmitter. In this scenario, the signal path is ever changing and fading becomes a highly dynamic factor influencing reception quality.

Diversity combats fading by providing additional communication elements capable of transmitting or receiving on different signal paths in the hope that at least one of these signal paths will remain un-faded at any particular instant in time. Diversity may be implemented on the transmit side using different frequencies, antennas, polarizations, or combinations thereof to transmit to a given receiver.

Implementing diversity on the receive side, which is a more common practice, usually entails providing multiple receiving elements, such as two or more receive antennas. With multiple receiving elements, the receiver may receive its signal of interest on multiple signal paths, thus increasing the likelihood that at least one of the signal paths will be unobstructed at any instant in time.

With transmit macro-diversity multiple transmitting antennas may be used to transmit signals to a given wireless receiver. When the antennas are individual elements in an antenna array, coherent transmit beamforming may be used to advantage. With this technique, reception performance is improved by the summation of transmit powers received from the multiple transmit antenna elements, as well as by the focusing of the transmit signal towards the receiver.

If the transmit antenna elements are not co-located, spatial transmit diversity may be achieved by transmitting the same signal from multiple, spaced-apart transmit antennas. However, non-coherent (e.g., time-offset) diversity signals transmitted in this manner increase the geographical spread of interference between different wireless receivers using the same communication channel.

With spatial diversity, multiple base stations may be employed to simultaneously transmit to one or more wireless receivers. Individual base stations identify themselves to the respective receivers by transmitting unique pilot codes. In many CDMA systems, the collection of base stations transmit the same pilot code sequence, but each base station uses a different code offset to uniquely identify itself. Under some circumstances, pilot codes from multiple base stations cause interference at the wireless receivers receiving these multiple pilot code signals. Such interference is termed pilot code pollution.

SUMMARY OF THE INVENTION

The present invention relates to a method of generating and using non-polluting pilot codes or other dummy signals in a wireless network that employs coherent transmit macro-diversity to permit determination of the requisite downlink channel parameters where there are fewer receivers than transmitters. Downlink channels are the signal propagation paths between network transmitters and the various wireless receivers served by the network. Dummy pilot signals are transmitted to imaginary wireless receivers in a manner that allows characterization of downlink channels between N transmitters (e.g., antennas) and M receivers, where N>M. The pilot codes are generated in a manner that does not cause interference in the real receivers. In an exemplary embodiment, the non-polluting pilot signals are used in a cellular radiotelephone system that employs coherent transmit macro-diversity.

With coherent transmit macro-diversity, more than one transmit signal is used to carry information for a wireless receiver. When multiple wireless receivers are involved, each transmit signal comprises a weighted combination of the individual information signals intended for the different receivers. The weighting is based on the propagation channels between each receiver and each transmitter, and is designed to cause reinforcement of the wanted signal with simultaneous cancellation of the unwanted signals at each receiver. That is, the various transmit signals combine at each receiver to cancel out all but that receiver's wanted signal.

Each receiver provides some form of loop back signal that the network uses to estimate the downlink channel between that receiver and the various transmitters being used to transmit to the receiver. A channel estimate matrix may be formed using this information, where each matrix column represents one of the N transmitters, and each matrix row represents one of the M wireless receivers, thus defining an N×M matrix. Where N>M, the channel estimate matrix is rank deficient and does not provide enough information for the network to determine the downlink channels between each transmitter and each receiver.

In a simple example where two transmitters transmit to one receiver, the present invention imagines a second, dummy receiver to exist where the propagation coefficients for the position of the imagined receiver are in some sense orthogonal to those of the real receiver. A pilot symbol stream is transmitted to the dummy receiver that is statistically independent and preferably orthogonal. Channel estimates for the downlink channels between the two transmitters and the one actual receiver are used in pre-filtering the pilot symbol stream for the dummy receiver. To the extent that the downlink channel estimates are accurate, the pilot symbol stream for the dummy terminal will be non-polluting with regard to the real receiver. Thus, correlation operations may be performed using the non-polluting pilot code based on loop back information from the real receiver to calculate the downlink channels to the real receiver.

In general, where there are N transmitters and M receivers, (N−M) dummy receivers are imagined and dummy pilot code symbol streams are transmitted to each one. Various techniques are available for figuratively locating the dummy receivers at positions having downlink path coefficients orthogonal to the paths of the real receivers. Such techniques may involve arbitrarily rotating multi-dimensional vectors about one or more similarly dimensioned vectors representing the estimated path coefficients to the real receivers.

In the above operations, adding dummy receivers is equivalent to adding rows to the channel estimate matrix. It may be seen that by adding each row as the time-reverse conjugate of its own co-factors, the determinant of the resultant expanded matrix is the same as the inverse of the original channel estimate matrix multiplied by its time-reverse conjugate. Thus, the above technique preserves the denominator poles of the original matrix, which means that the desired signal gain achieved from using coherent transmit macro-diversity is preserved when using non-polluting pilot codes in accordance with the present invention.

DETAILED DESCRIPTION OF THE INVENTION

In the Applicant's co-pending application, "COHERENT TRANSMIT MACRO-DIVERSITY IN WIRELESS COMMUNICATION," a novel system and method for practicing coherent transmit macro-diversity are presented. This co-pending application is incorporated in its entirety herein by reference. With coherent transmit macro-diversity, two or more transmitters are used to simultaneously transmit to a wireless receiver. The transmit signals are weighted based on the downlink propagation channels between each of the transmitters and the receiver. At the receiver, the transmit signals combine in a manner that reinforces the receiver's desired information signal, while canceling other information signals intended for other receivers that might also be carried in the transmit signals. Interference cancellation in this manner relies on forming the transmit signals based on downlink channel estimates.

Figure 1:
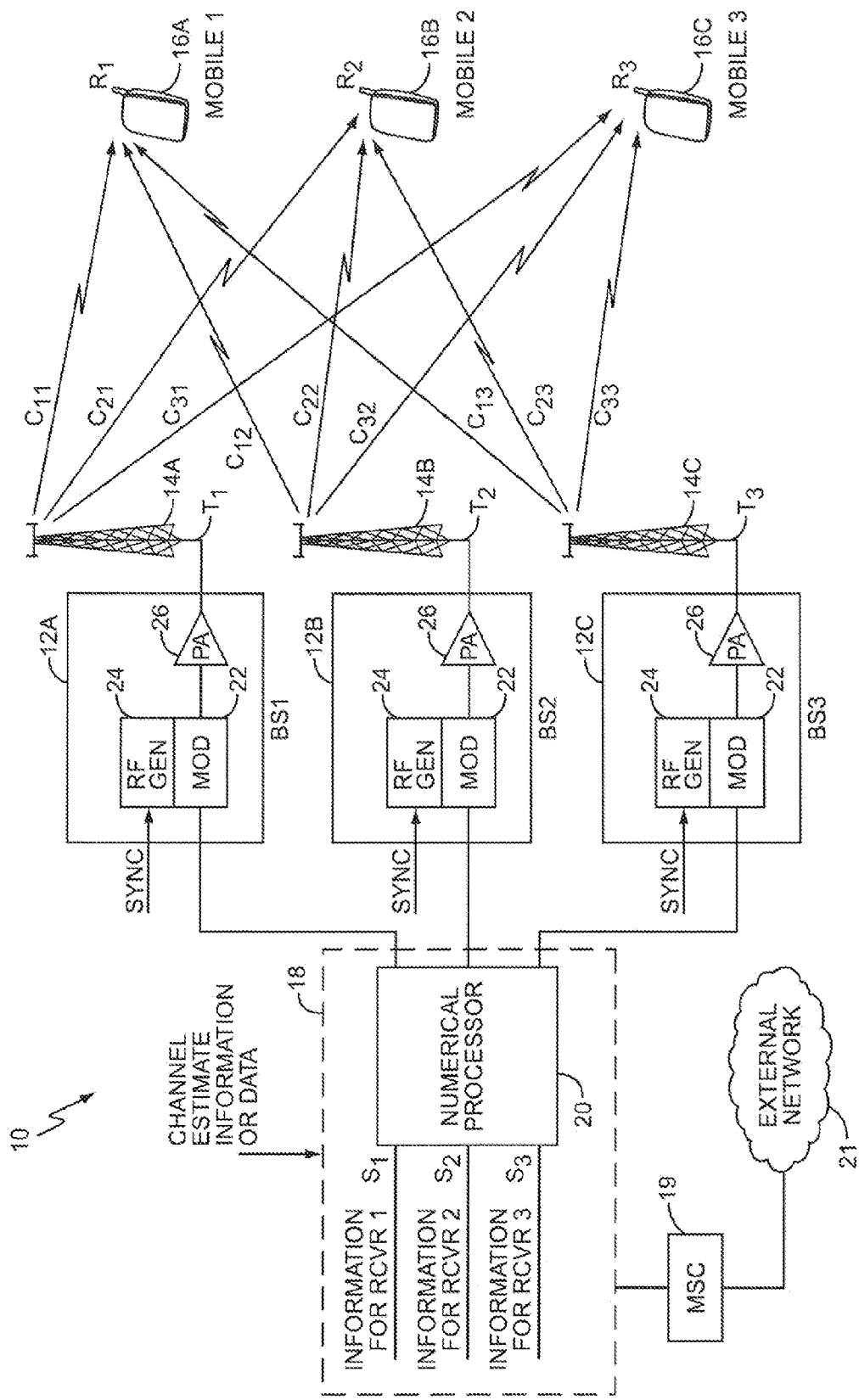
FIG. 1 is diagram of an exemplary wireless communication network for practicing coherent transmit macro-diversity.

FIG. 1 is a diagram of an exemplary wireless communication network 10 for practicing one embodiment of coherent transmit macro-diversity in accordance with the above-incorporated co-pending application. A plurality of base stations 12 transmit via corresponding transmit antennas 14 to a plurality of wireless receivers, shown here as mobile terminals 16. A central processing system, referred to herein as a transmit processor 18, provides transmit signals to each base station 12 in baseband form. In turn, each base station 12 converts its input transmit signal into a form suitable for transmission from its associated antenna 14. The transmit processor 18 may, for example, be associated with or be part of a mobile switching center (MSC) 19 that interfaces the network 10 with one or more external networks 21. Such external networks 21 may include the Public Switched Telephone Network (PSTN), and one or more packet data networks (PDNs), such as the Internet.

As illustrated, there is a one-to-one correspondence between the number of antennas 14 (e.g., transmitting elements or stations) and the number of mobile terminals 16. However, the ratio may be varied such that there are more or fewer transmit stations than there are wireless receivers. Indeed, the non-polluting pilot codes of the present invention provide exemplary techniques for practicing coherent transmit macro-diversity where there are fewer receivers than transmitters.

Referring again to the illustration, base station 12A broadcasts transmit signal $T_1$ via antenna 14A, and likewise, base stations 12B and 12C broadcast transmit signals $T_2$ and $T_3$ via antennas 14B and 14C, respectively. Each transmit signal $T_X$ represents a weighted combination of the different information signals intended for respective ones of the mobile terminals 16. Each mobile terminal 16 receives each of the transmit signals, albeit through different downlink propagation channels. That is, each mobile terminal 16 receives the combination of $T_1$, $T_2$, and $T_3$, as affected by the propagation channels between that mobile terminal 16 and point of transmission for $T_1$, $T_2$, and $T_3$.

The set of downlink channels between each transmit antenna 14 and each mobile terminal 16 may be represented using the nomenclature $C_{jk}$. This symbol denotes the channel between the jth wireless receiver (e.g., a given one of the mobile terminals 16) and the kth transmitter (e.g., a given one of the transmit antennas 14). Thus, in the illustration, $C_{11}$ denotes the channel between mobile terminal 16A and transmit antenna 14A, $C_{12}$ denotes the channel between mobile terminal 16A and transmit antenna 14B, and so on.

Typically, the propagation channel between a given antenna 14 and a given mobile terminal 16 comprises a number of downlink propagation paths. These multiple propagation paths, referred to as multipaths, each have characteristic attenuation, phase, and delay attributes, which may be expressed as a complex coefficient representing magnitude and phase, and a corresponding delay attribute. Thus, channel coefficient $C_{jk}$ may be represented by the polynomial $C_0 + C_1 z^{-1} + C_2 z^{-2} + \ldots + C_{n-1} z^{-(n-1)}$, where $C_n$ represents the channel coefficient associated with a single multipath and $z^x$ is a delay operator that represents the unit delay of the various multipaths relative to the first received multipath. The time delay operator could be expressed relative to a multipath other than the first received multipath, in which case the above expression might include channel coefficients with positive delay elements (e.g., $C_x z^{+4}$, $C_{x-1} z^{+3}$, and so on).

In any case, the above expressions demonstrate that the multipath channel between any transmit antenna 14 and a mobile terminal 16 may be expressed as a polynomial in z, based on the channel coefficients and corresponding path delays associated with the multipaths involved. The complete set of channel coefficients from all antennas to all receivers forms a channel estimate matrix and may be expressed as follows:

$$\begin{bmatrix} C_{11} & C_{12} & C_{13} \\ C_{21} & C_{22} & C_{23} \\ C_{31} & C_{32} & C_{33} \end{bmatrix} \quad \text{(Eq. 1)}$$

where each matrix element $C_{jk}$ is a polynomial that corresponds to one multipath channel between a given transmit station and a given mobile terminal. Again, transmit station broadly refers to the transmitting element associated with one of the transmit signals.

In this example, the channel estimate matrix is used to generate transmit signals $T_1$, $T_2$, and $T_3$ in such a manner as to allow the same downlink communication channel to be used by multiple mobile terminals 16 operating within the same service area. The transmit signals $T_1$, $T_2$, and $T_3$ comprise weighted combinations of information signals $S_1$, $S_2$, and $S_3$, which are intended for three different mobile terminals. Information signals $S_1$, $S_2$, and $S_3$ are combined such that each mobile terminal 16 receives only its wanted signal, with the unwanted signals (e.g., those intended for the other mobile terminals 16) canceling.

To better understand the approach to the unwanted signal cancellation, it is helpful to examine the received signal R at any one of the receivers (e.g., mobile terminals 16). The signal received by a mobile terminal 16 during a given symbol period may be described by the following equation, $$R(i)=C_0 S(i)+C_1 S(i-1)+C_2 S(i-2)+\ldots+C_{L-1} S(i-L+1), \quad \text{(Eq. 2)}$$

where R(i) is the complex value of the received signal sample (with carrier frequency removed) at time instant i, S(i) is the symbol transmitted at time i, $C_j$ is the complex number describing the phase and amplitude of the propagation path with j-symbol periods of delay (relative to the shortest path, $C_0$), and L represents the number of multipaths between the antenna 14 and the mobile terminal 16.

The combination of a signal with itself delayed in steps of one symbol period may also be described by the use of the Z-transform. A discrete-time signal S that is delayed by one sample is denoted by $z^{-1} \cdot S$, where "z" is the time advance operator and its reciprocal is the time delay operator. Thus the polynomial $a+bz^{-1}+cz^{-2}$ times S means $aS(i)+bS(i-1)+cS(i-2)$.

Therefore, equation (1) can be written as:

$$R=C(z^{-1})S \quad \text{(Eq. 3)}$$

where "C" is now a polynomial, in $z^{-1}$, with coefficients $C_0 \ldots C_{L-1}$, and R stands for a received signal sample stream, while S stands for the corresponding transmitted symbol stream.

If $R_j$ denotes the signal received at receiver j and $T_k$ denotes the signal transmitted by transmit antenna k, the entire picture of propagation from all antennas 14 to all mobile terminals 16 may be described by the matrix equation, $$[R]=[C]\cdot[T] \quad \text{(Eq. 4)}$$

where C is the channel estimate matrix from Eq. 1. For the 3×3 example of FIG. 1, Eq. (4) is expressed as, $$\begin{bmatrix} R_1 \\ R_2 \\ R_3 \end{bmatrix} = \begin{bmatrix} C_{11} & C_{12} & C_{13} \\ C_{21} & C_{22} & C_{23} \\ C_{31} & C_{32} & C_{33} \end{bmatrix} * \begin{bmatrix} T_1 \\ T_2 \\ T_3 \end{bmatrix} \quad \text{(Eq. 5)}$$

Here, $R_1$ is the composite signal received at mobile terminal 16A, $R_2$ is the composite signal received at mobile terminal 16B, and $R_3$ is the composite signal received at mobile terminal 16C. Similarly, $T_1$ is the transmit signal from antenna 14A, $T_2$ is the transmit signal from antenna 14B, and $T_3$ is the transmit signal from antenna 14C. Thus, each $R_x$ is a composite of the three transmit signals $T_1$, $T_2$, and $T_3$, each one received through a different propagation path relative to the receiver receiving $R_x$. In turn, each of the transmit signals $T_k$ comprises differently weighted components of each of the desired information signals $S_1$, $S_2$, and $S_3$.

If we desire each receiver j (e.g., a given mobile terminal 16) to receive only its intended symbol stream $S_j$, then the transmit signals $T_k$ needed to achieve that are given by, $$[T]=[C]^{-1}\cdot[S] \quad \text{(Eq. 6)}$$

where $[C]^{-1}$ is the inverse of the channel estimate matrix [C], and [S] is the matrix of desired information symbol streams intended for the set of mobile terminals 16. In Eq. (6), each $T_k$ in [T] comprises a weighted combination of the information symbol streams $S_j$ intended for each receiver. Assuming that the channel coefficients for the propagation paths are estimated correctly, multiplication of the symbol stream matrix [S] by the inverse of the channel estimate matrix $[C]^{-1}$ yields the transmit symbol matrix [T] which results in complete cancellation of the unwanted signals at each mobile terminal 16. Thus the problem at hand concerns how to invert the channel estimate matrix [C] of z-polynomials, and whether such an entity exists and is numerically well or ill conditioned.

Matrix theory describes the procedure for computing the inverse of a matrix as follows. First, transpose the matrix then replace every element by its cofactor to obtain a matrix known as the adjoint matrix. Then divide each element of the adjoint matrix by the determinant of the original matrix to obtain the inverse matrix.

The determinant of a matrix is given by sums of products of its elements and is computable in a deterministic fashion. For example, assuming the following 3×3 channel estimate matrix, $$[C] = \begin{bmatrix} C_{11} & C_{12} & C_{13} \\ C_{21} & C_{22} & C_{23} \\ C_{31} & C_{32} & C_{33} \end{bmatrix} \quad \text{(Eq. 7)}$$

the determinant may be calculated as:

$$C_{11}(C_{22}\cdot C_{33}-C_{32}\cdot C_{23})- \\ C_{12}(C_{21}\cdot C_{33}-C_{31}\cdot C_{23})+C_{13}(C_{21}\cdot C_{32}-C_{31}\cdot C_{22}) \quad \text{(Eq. 8)}$$

The cofactor of element $C_{11}$ is $(C_{22}\cdot C_{33}-C_{32}\cdot C_{23})$, which is therefore the first element of the adjoint matrix. The first element of the inverse matrix is thus, $$\frac{(C_{22}\cdot C_{33}-C_{32}\cdot C_{23})}{C_{11}(C_{22}\cdot C_{33}-C_{32}\cdot C_{23})- \\ C_{12}(C_{21}\cdot C_{33}-C_{32}\cdot C_{23})+ \\ C_{13}(C_{21}\cdot C_{32}-C_{31}\cdot C_{22})} \quad \text{(Eq. 9)}$$

When each matrix element $C_{jk}$ in the above expression is a z-polynomial, it may be deduced that the expression's numerator is a z-polynomial of twice the order of the $C_{jk}$, while the denominator is a polynomial of three times the order of $C_{jk}$. Therefore, the inverse matrix comprises elements that have both a numerator z-polynomial and a denominator z-polynomial. According to Eq. 6, information bearing signals $S_j$ to be transmitted to the mobile terminals 16 must be processed by multiplication with respective inverse matrix elements and summed to produce the transmit signals $T_k$.

If the exact inverse C-matrix (downlink channel coefficient matrix) is applied to the information signals $S_j$ to form the transmit signals $T_k$ from each of the antennas 14, the mobile terminals 16 will receive only their intended information signal $S_j$ with multipath interference already cancelled at the transmitter, since the resulting channel from the transmitter to the receiver is $[C] \cdot [C]^{-1}$, which is unity.

Referring still to FIG. 1, information symbol streams $S_1$, $S_2$, and $S_3$ intended respectively for mobile terminals 16A, 16B, and 16C are input to a central transmit processor 18 that serves a plurality of base stations 12A, 12B and 12C. Transmit processor 18 includes a numerical processor 20 to perform the matrix operations on the information signals as described above. Using knowledge of the multipath channels $C_{jk}$, the numerical processor 20 filters the information signals $S_1$, $S_2$ and $S_3$ and forms weighted combinations of the information signals $S_1$, $S_2$ and $S_3$ to generate transmit signals $T_k$. The information signals $S_1$ $S_2$ and $S_3$ may be processed by the numerical processor 20 at baseband, which equates to symbol-rate processing. Processing by the numerical processor 20 is described in greater detail below.

The transmit signals $T_k$ are relayed from the transmit processor 18 to respective base stations 12A, 12B, and 12C, where they are converted to continuous time waveforms by digital-to-analog converters (not shown) and up-converted to a desired radio frequency channel by modulators 22 in respective base stations 12A, 12B, and 12C. The up-converted signals are then amplified to desired transmit power levels by PAs 26 in each of the base stations 12 and transmitted by respective antennas 14A, 14B, and 14C. Jointly transmitting the desired information signals as combined transmit signals from the respective transmitters may be synchronized, for example, by the MSC 19, which could provide a synchronization signal to each of the transmitting base stations 12.

Figure 2:
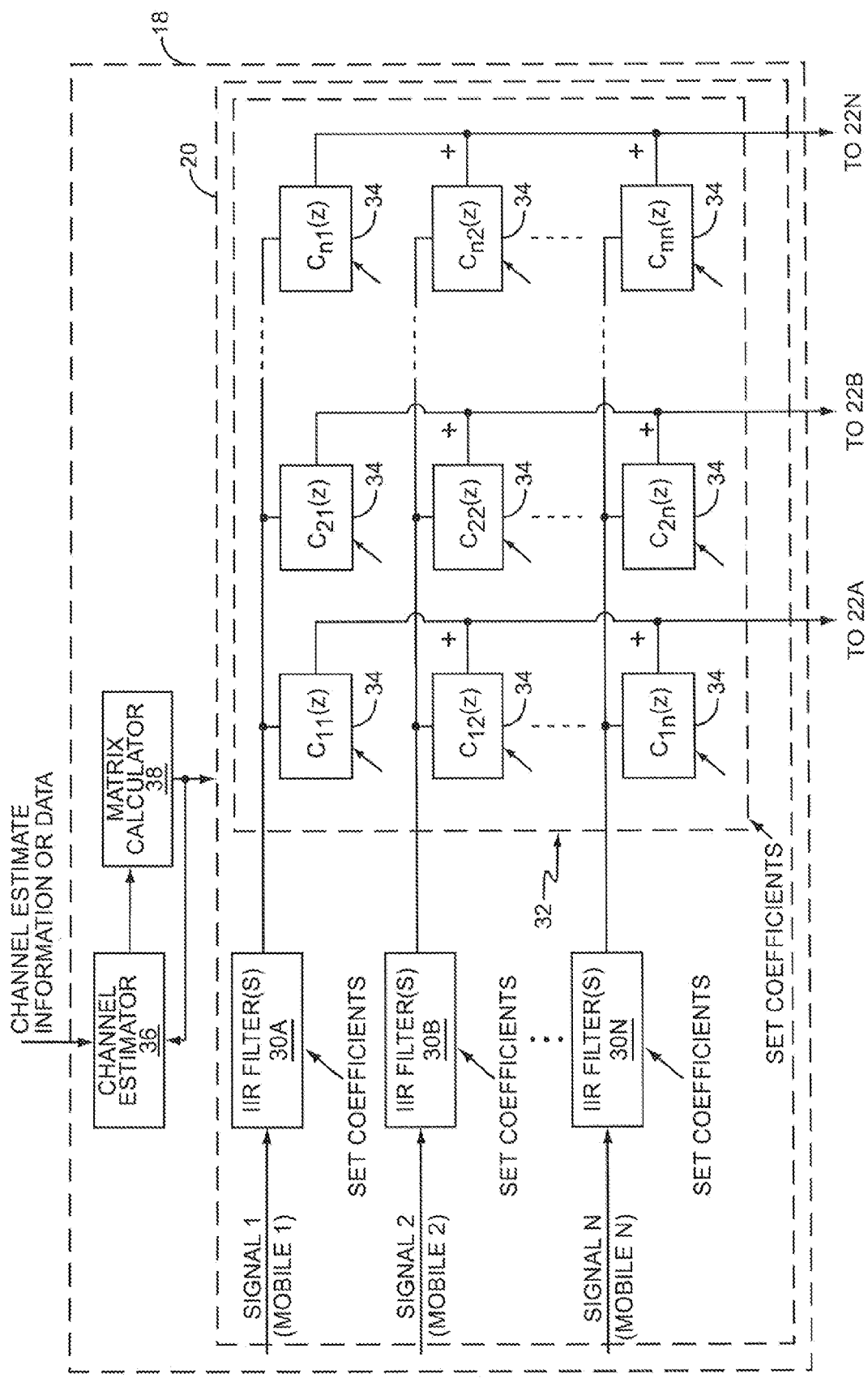
FIG. 2 is a diagram of an exemplary transmit processor for implementing transmit pre-filtering used in macro-diversity transmission.

FIG. 2 illustrates the transmit processor 18 and numerical processor 20 in greater detail. The illustration assumes N transmit antennas 14 transmitting N transmit signals to N=M mobile terminals 16. Numerical processor 20, as previously described, processes the information signals $S_1$, $S_2$ and $S_3$ to form the set of transmit signals, $T_1$ $T_2$ and $T_3$ that results in unwanted signal cancellation at each mobile terminal 16. Numerical processor 20 comprises a set of Infinite Impulse Response (IIR) filters 30 and an array 32 of Finite Impulse Response (FIR) filters 34. Transmit processor 18 includes, in addition to the numerical processor 20, a channel estimator 36 and a matrix calculator 38.

The channel estimator 36 derives the set of channel coefficients characterizing the multipath channels $C_{jk}$ between each of the antennas 14 and each of the mobile terminals 16. The set of coefficients output from channel estimator 36 is referred to herein as channel state information (CSI). The channel estimator 36 outputs these channel coefficients to the matrix calculator 38, which calculates the coefficients of the IIR and FIR filters as previously described. More particularly, the channel estimator 36 provides N×N×L channel coefficients describing the N×N multipath channels $C_{jk}$ from each one of the N antennas 14 to each one of the N mobile terminals 16. L is the impulse response length of the multipath channels $C_{jk}$, which equates to the number of multipaths in each multipath channel $C_{jk}$.

Treating each set of channel coefficients as a z-polynomial of order L and as an element of an N×N square matrix (i.e., the channel estimate matrix above), the matrix calculator 38 forms the N×N adjoint matrix, whose elements are polynomials of order (N−1)L, and a determinant polynomial of order NL. Matrix calculator 38 factors the determinant polynomial to determine the NL roots of the determinant polynomial and deletes the L roots having smallest absolute value of logmagnitude, leaving (N−1)L roots forming a reduced determinant polynomial of order (N−1)L. The reduced determinant polynomial determines the IIR filter as previously described and the adjoint matrix determines the coefficients of the FIR filters 34 in filter array 32.

The information bearing signals $S_j$ (e.g., symbol streams $S_1$, $S_2$, and $S_3$) carrying desired information for mobile terminals 16A, 16B, and 16C, respectively are input to numerical processor 20. Within the numerical processor 20, signals $S_j$ are processed through IIR filters 30 of order (N−1)L corresponding to the reduced denominator polynomial and through FIR filters 34 of order (N−1)L corresponding to the adjoint matrix polynomials as follows.

Information blocks intended to be transmitted to different mobile terminals 16 are assembled in the transmit processor 18. First the information signals are IIR filtered by the respective IIR filters 30A-30N, which compensates for anticipated intersymbol interference (ISI) caused by delayed versions of the same signal $S_j$. In this exemplary implementation, the IIR filters 30 are formed from the determinant z-polynomial of the channel estimate matrix [C], and may be reduced in order by omission of factors corresponding to roots closest to the unit circle as previously described. The number of roots omitted may be anything from none up to the equalizer capability of the respective mobile terminals 16. The IIR filters 30 comprise one or more filter elements corresponding to the reciprocals of the roots of the reduced determinant z-polynomial. Each information block is passed in the reverse time direction through those filter elements formed from the reciprocals of roots of the reduced determinant that have a magnitude greater than unity and in the forward time direction through filter elements formed from the reduced determinant roots of magnitude less than unity to obtain IIR-processed blocks.

The IIR processed blocks are then FIR processed by matrix multiplication with the adjoint matrix polynomials to obtain transmit signal blocks. Filter array 32, comprising FIR filters 34, processes the IIR-filtered signals to compensate for interference between signals $S_1$, $S_2$, and $S_3$ at the mobile terminals 16. Each signal is processed by a corresponding row of FIR filters 34 in the FIR filter array 32. The output signals from FIR filters 34 are summed down filter array columns, indicated by the + sign at the junction of the line from one output to another. These summed outputs represent the baseband combined transmit signals relayed by the transmit processor 18 to the modulators 22 used to generate transmit signals $T_1 \ldots T_N$, which are in turn transmitted by transmit antennas 14A $\ldots$ 14N.

Note that each of the FIR filters 34 is updated with new coefficients as needed based on changing propagation path channel coefficients. Also, note that the FIR filters 34 in the filter array 32 correspond to elements in the adjoint of the channel estimate matrix C. Thus, each signal input into the filter array 32 is processed by a row of filters 34 corresponding to a respective row in the adjoint matrix discussed above.

The transmit signal may be further filtered to restrict transmission bandwidth and up-sampled and converted to continuous time signals. The transmit signals, denoted as $T_1$, $T_2$, and $T_3$ in the illustration, are output by the transmit processor 18 and coupled to corresponding base stations 12, which may be base transceiver stations (BTSs). A modulator 22 in each BTS modulates the input transmit signal onto an RF carrier signal provided by an RF generator 24 which is amplified by a suitable RF power amplifier (PA) 26 to make the transmit signals (i.e., $T_1$, $T_2$, or $T_3$) discussed above suitable for transmission. Since IIR, FIR and bandwidth-restriction filtering are all linear processes, they may be carried out in any order. Generating $T_1$, $T_2$, and $T_3$ in this manner causes the combination of transmit signals to cancel differently at each mobile terminal 16, such that each mobile terminal 16 receives only its desired signal.

Figure 3:
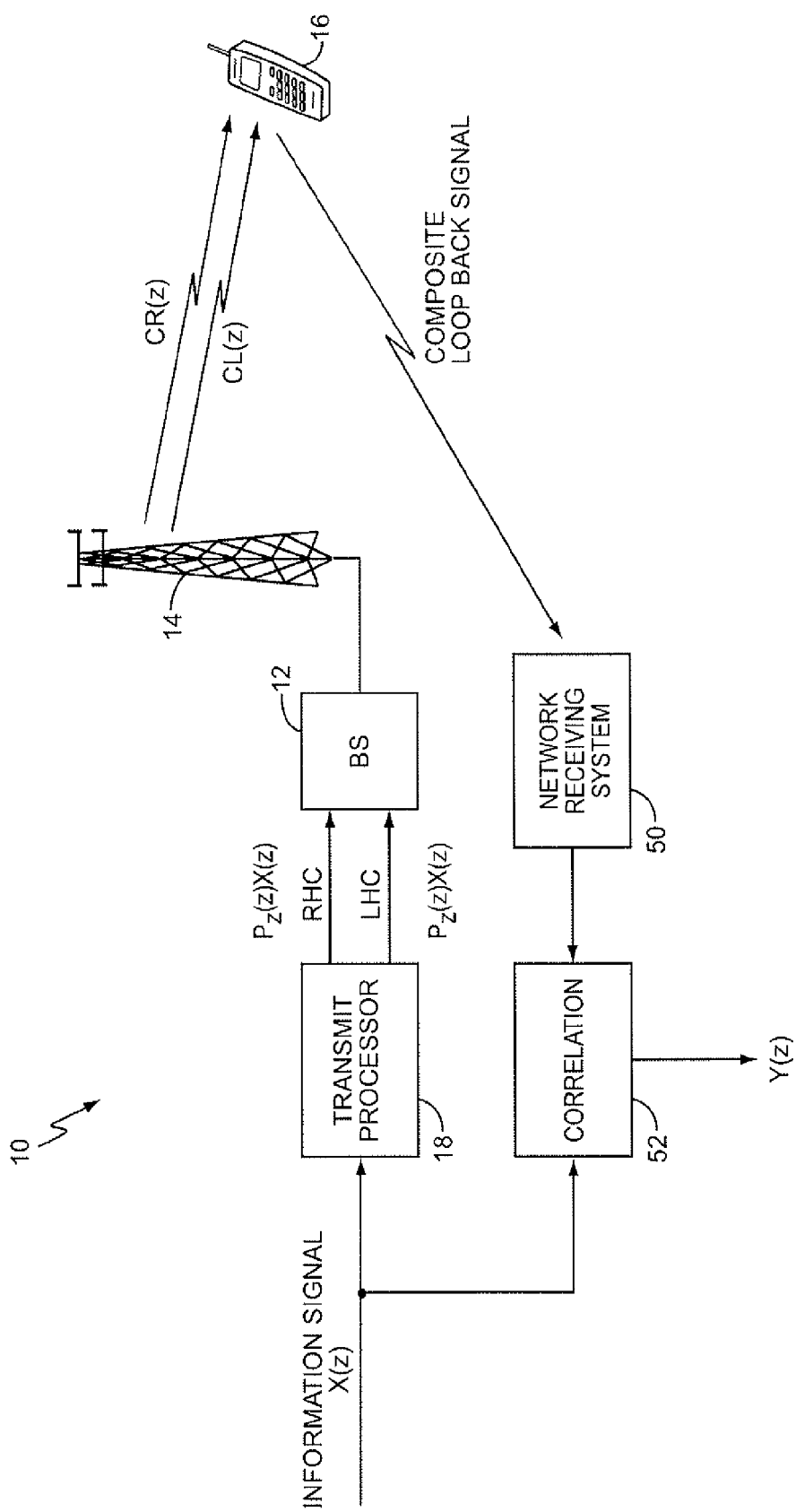
FIG. 3 is an exemplary diagram for using non-polluting pilot codes in the network of FIG. 1 to facilitate propagation channel estimation in accordance with the present invention.

Earlier reference was made to practicing coherent transmit macro-diversity with varying ratios of transmitters and receivers. FIG. 3 illustrates the network 10 with additional details where there are two transmitters and one wireless receiver. Later discussion expands this to the more generalized case of N transmitters and M receivers, where N>M. A network receiving system 50 and a loop back signal processor 52 allow the network 10 to determine how much interference is caused at one or more receivers by one or more transmitted dummy signals for reasons explained later.

In FIG. 3, the information signal X(z) for the mobile terminal 16 feeds into the transmit processor 18. The information signal X(z) may be, for example, a chip, symbol, or signal sample stream. In this example, the transmit processor 18 operates on the single information signal X(z) to produce Right-Hand Circular (RHC) and Left-Hand Circular (LHC) polarized transmit signals by passing X(z) through transmit pre-filters $P_1(z)$ and $P_2(z)$, respectively. Thus, in this exemplary implementation, two separate transmitters are formed by using two cross-polarized antennas on the same mast or tower. However, other implementations can be used in which the separate transmitters are located at different sites and may have the same or different polarizations. Transmit pre-filters $P_1(z)$ and $P_2(z)$ are determined within the network 10 and, hence, are known to the transmit processor 18.

The resultant two transmit signals $P_1(z)X(z)$ and $P_2(z)X(z)$ are passed to the base station 12, where they are translated into a format suitable for transmission from the dual polarized antenna 14. That is, the two transmit signals are each transmitted to the mobile terminal 16 on different polarizations. The mobile terminal 16 receives the signals after propagation through the different propagation channels for the two signal polarizations, where the RHC channel is expressed as CR'(z) and the LHC channel as CL'(z). The mobile terminal thus receives $Y(z)=(P_1(z)CR'(z)+P_2(z)CL'(z))X(z)$.

The mobile terminal 16 provides a network receiving system 50 with a composite loop back signal. Note that the receiving system 50 is diagrammed separately here for clarity of discussion, but in actual application may simply be incorporated into the base station 12 as part of its normal radio transceiver interface. Loop back processing entails correlating the loop back signal from the mobile terminal 16 in the loop back processor 52 and correcting for uplink channel effects, after which the Y(z) signal is recovered and the composite downlink channel $P_1(z)CR'(z)+P_2(z)CL'(z)$ is obtained.

However, this cannot be uniquely portioned to determine estimated downlink channels CR(z) and CL(z) corresponding to the actual channels CR'(z) and CL'(z) given $P_1(z)$ and $P_2(z)$, as witnessed by the fact that the above expression is identical to $P_1(z)(CR'(z)+aP_2(z))+P_2(z)(CL'(z)-aP_1(z))$. Thus, because the terms $P_1(z)aP_2(z)$ and $-P_2(z)aP_1(z)$ cancel, it is not possible to determine an estimate for CR'(z) within an arbitrary multiple "a" of $P_2(z)$ nor is it possible to determine an estimate of CL'(z) within an arbitrary multiple "a" of $P_1(z)$.

The present invention determines one or more other information signals, streams, or pilot codes for joint transmission with the information signal transmissions to the real receivers that enables determination of the downlink channels between the transmitters and the real receivers. In the current example, transmitting a dummy pilot code as an additional pilot code signal permits estimation of CR'(z) and CL'(z) without causing added interference at the mobile terminal 16. In general, one or more dummy signals are transmitted along with the information signals. The dummy signals are pre-filtered along with the information signals in the transmit processor 18 in a manner that will result in cancellation of the dummy signals at each mobile terminal 16, provided that the propagation channel estimates used by the transmit processor 18 in transmit pre-filtering substantially match the actual propagation channels between the transmitters and the receivers. In this way, the extent to which the dummy signal does interfere at the receivers may be used to guide adjustment of the propagation channel estimates so that they more closely match the actual channel characteristics.

In the context of the current dual-polarization, single mobile terminal example, a dummy pilot code S(z) is transmitted on each antenna polarization. Pre-filtering is applied to the signal S(z), such that $-CL(z)S(z)$ is transmitted from the RHC antenna element of antenna 14, while CR(z)S(z) is transmitted by the LHC antenna element. Here, the CL(z) and CR(z) terms are estimates of the actual downlink channels CL'(z) and CR'(z), rather than the actual downlink channels.

Thus, the mobile terminal 16 receives $(-CL(z)CR'(z)+CR(z)CL'(z))S(z)$, which equals zero (0) if the channel estimates match the actual downlink channels. That is, the dummy pilot signal cancels out at the mobile terminal 16 if the pre-filtering polynomial CL(z) matches CL'(z) and pre-filtering polynomial CR(z) matches CR'(z). The dummy pilot code S(z) would be received strongest at a virtual receiver location to which the propagation channels were $-CL(z)^\#$ for the RHC and $CR(z)^\#$ for the LHC. Here the "#" symbol denotes the time-reverse, conjugate transpose of a matrix. Detailed descriptions of this notation and the underlying operations appear in the previously incorporated, co-pending application entitled "COHERENT TRANSMIT MACRO-DIVERSITY."

The channel estimate matrix for the intended signal to the mobile terminal 16 and the dummy pilot signal is thus given as, $$[C] = \begin{bmatrix} CR & CL \\ -CL^\# & CR^\# \end{bmatrix}$$

which is now square. The pre-filter for transmitting X(z) to the real mobile terminal 16 and S(z) so as not to interfere with the mobile terminal 16 is the adjoint of the above matrix, and is thus expressed as, $$\begin{bmatrix} CR^\# & CL^\# \\ -CL & CR \end{bmatrix},$$

which may be expressed in terms of the transmit filters $P_1(z)$ and $P_2(z)$ as, $$\begin{bmatrix} P_1(z) & P_2(z) \\ -P_2(z)^\# & P_1(z)^\# \end{bmatrix}.$$

With the above pre-filter, the loop back signal received from the real mobile terminal is, $(P_1(z)CR'(z)+P_2(z)CL'(z))X(z)+(P_1^\#(z)CL'(z)-P_2^\#(z)CR'(z))S(z).$ Correlation with the independent symbol streams X(z) and S(z) after compensation of the loop back signal for the uplink channel effects yields, $$P_1(z)CR'(z) + P_2(z)CL'(z) \text{ for correlation with } X(z),$$

and $$-P_2^\#(z)CR'(z) + P_1^\#(z)CL'(z) \text{ for correlation with } S(z).$$

These two expressions are sufficient for calculating estimates of the actual downlink channels CR'(z) and CL'(z) to be used in transmit pre-filtering.

Imagining a virtual or dummy terminal to exist where its propagation channels were in some sense orthogonal to those of the real mobile terminal 16 solved the information deficiency in the above example where the channel estimate matrix was 1 row×2 columns (i.e., one real information signal and receiver and two transmitters). Adding the dummy pilot signal S(z) made this matrix square (2×2). The matrix elements in the additional row arising from S(z) being transmitted to the virtual location of the dummy terminal may be seen to be the time-reverse conjugates of the elements' cofactors. The determinant of the 2×2 channel estimate matrix is thus of the form, $$CR(z)CR^\#(z)+CL(z)CL^\#(z),$$

which is the same as $[C\ C^\#]$, where "C" represents the original 1×2 matrix before supplementing with a row vector for S(z) as above, and $C^\#$ is the time-reverse conjugate transpose of C. The addition of the row vector for the dummy terminal and its propagation channels has therefore not affected the poles of the denominator of the over-dimensioned problem (i.e., the deficient 1×2 channel estimate matrix). The desirable gain of the over-dimensioned solution therefore remains intact.

A solution for a three-transmitter/two-receiver scenario may be deduced as follows:
Let the starting, information deficient 2×3 channel estimate matrix be expressed as, $$C = \begin{bmatrix} C_{11}(z) & C_{12}(z) & C_{13}(z) \\ C_{21}(z) & C_{22}(z) & C_{23}(z) \end{bmatrix},$$

where the rows correspond to the two real receivers (e.g., mobile terminals 16) and the columns correspond to the three transmitters (e.g., three base stations 12).

The imagined third receiver needed to make the above channel estimate matrix square should have dummy propagation channels forming a third row vector of polynomials that is orthogonal to both of the first two rows. A three-element vector "V" perpendicular to the two given three-element vectors represented by rows 1 and 2 can be formed from the cross product of row 1 and row 2 as, $$V = \text{row } 1 \times \text{row } 2 = C_{12}C_{23} - C_{22}C_{13};\ C_{13}C_{21} - C_{11}C_{23};$$
and
$$C_{11}C_{22} - C_{12}C_{21}.$$

The virtual channel, that is the channel(s) to the imagined or dummy terminal, should be chosen to be the time-reverse conjugate of the above. Namely, row 3 should be chosen as $V^\#$, such that, $$C_{31}=C_{12}^\# C_{23}^\# - C_{22}^\# C_{13}^\#,$$

$$C_{32}=C_{13}^\# C_{21}^\# - C_{11}^\# C^{23\#}, \text{ and}$$

$$C_{33}=C_{11}^\# C_{22}^\# - C_{12}^\# C_{21}^\#,$$

where each element of the third row may be verified to be the time-reverse conjugate of the element's cofactor. Thus, in the expansion of the 1×2 case and in the expansion of the 2×3 case to completely determined 2×2 and 3×3 cases, respectively, using virtual channel construction as above, there is no alteration of determinant poles. Thus, virtual channel construction in accord with the present invention preserves the efficiency and advantages of the over-dimensioned N transmitters×M receivers condition, where N>M.

Where three transmitters, such as three base stations 12, collaborate to form a coherent macro-diversity transmission to a single mobile terminal 16, two non-polluting pilot-code transmissions (e.g., S1(z) and S2(z)) are added. The virtual location of the two dummy terminals are selected based on orthogonality considerations with respect to propagation channel(s) of the real terminal 16.

When two vectors are given in three-dimensional space, a third vector perpendicular to both of them is unique; however, when only one vector in three-dimensional space is given, constructing another two perpendicular vectors is not represented by a unique solution. Instead, such vector construction involves the arbitrary rotation about the given vector.

For example, given channels $C_{11}$, $C_{12}$, and $C_{13}$ in the first row, a dummy vector may be constructed for the second row as 0, $-C_{13}^\#$, and $C_{12}^\#$, and used for transmitting a first dummy pilot signal $S_1(z)$. Then, the elements in the third row vector for transmitting the second dummy pilot signal $S_2(z)$ may be determined to be equal to the time-reverse conjugate of the elements' cofactors. This may be expressed as, $$C_{31}=C_{12}C_{12}^\# + C_{13}C_{13}^\#,$$

$$C_{32}=-C_{11}^\# C_{12}, \text{ and}$$

$$C_{33}=-C_{11}^\# C_{13}.$$

However, other choices may be found for row 2, which would result in other values being calculated for row 3. In all cases, however, the vectors for the added rows are chosen to preserve the denominator poles and thus the efficiency of the over-dimensioned 1×3 condition.

Generally, a mobile terminal 16 may be located within a triangle of three base stations 12, and therefore the above discussion of polynomial matrices was limited to a maximum dimension of three. However, it may be deduced by extrapolation that the elements in a virtual Nth row in an N−1×N over-dimensioned channel estimate matrix would turn out to be the time-reversed conjugate of those elements' cofactors in the squared up N×N channel estimate matrix. Likewise, in an N−2×N problem, the N−1 row may be determined by setting any polynomial element in the N−2 row to zero and making the remaining N−1 polynomials in that row the time-reverse conjugates of their own cofactors in the N−1×N−1 matrix formed from the remaining rows and columns not containing the zero polynomial. Then, the Nth row may be filled in as above.

As an example, assume that four base stations 12 will transmit information signals to two mobile terminals 16. The channel estimate matrix initially comprises a 2×4 matrix expressed as, $$C = \begin{bmatrix} C_{11} & C_{12} & C_{13} & C_{14} \\ C_{21} & C_{22} & C_{23} & C_{24} \end{bmatrix},$$

where row 1 corresponds to the information signal for receiver 1 (i.e., one of the two mobile terminals 16), row 2 corresponds to receiver 2 (i.e., the other mobile terminal 16), and columns 1 through 4 correspond to transmitters 1-4 (i.e., the four base stations 12).

Here, the starting matrix C will be supplemented with two additional rows corresponding to dummy pilot signals in order to make the channel estimate matrix square. First, a 3×4 matrix is formed by adding the first supplemental row to the starting matrix as its third row. The supplemental row may be considered to be a channel estimate vector for the propagation channels between the four transmitters and the imagined location of the virtual receiver to which the first dummy pilot signal will be transmitted.

To determine the values of each element in this third row, one row element is made zero, and the column in which that element is located is not considered in cofactor calculations for the remaining elements in the third row. The cofactor of each remaining element in the third row of the 3×4 matrix is then calculated using the various 2×2 cofactor matrices formed using the values in the two starting rows, with the final value of each third row element being set as the time-reverse conjugate of its cofactor. Thus, the 3×4 channel matrix now appears as, $$C = \begin{bmatrix} c_{11} & c_{12} & c_{13} & c_{14} \\ c_{21} & c_{22} & c_{23} & c_{24} \\ 0 & \alpha_{32}^{\#} & \alpha_{33}^{\#} & \alpha_{34}^{\#} \end{bmatrix},$$

where "$\alpha_{ij}$" denotes the cofactor of matrix element in row i, column j, and "$^{\#}$" denotes the time-reverse conjugate operator as defined earlier. Of course, any of the row 3 elements could have been arbitrarily made zero in the above example, and the cofactor calculations varied accordingly.

Now, with the N−1 row added (i.e., the third row), the Nth or fourth row is added. The elements of the fourth row are calculated as the time-reverse conjugates of each row element's cofactor. Thus, the channel estimate matrix used to pre-filter the jointly transmitted information signals and dummy pilot signals is given as, $$C = \begin{bmatrix} c_{11} & c_{12} & c_{13} & c_{14} \\ c_{21} & c_{22} & c_{23} & c_{24} \\ 0 & \alpha_{32}^{\#} & \alpha_{33}^{\#} & \alpha_{34}^{\#} \\ \alpha_{41}^{\#} & \alpha_{42}^{\#} & \alpha_{43}^{\#} & \alpha_{44}^{\#} \end{bmatrix}.$$

The above channel estimate matrix thus represents the original or starting 2×4 matrix supplemented with two additional rows (i.e., rows 3 and 4) corresponding to two dummy pilot signals. Because the matrix elements in rows 3 and 4 are computed or manipulated such that they are in some sense orthogonal to rows 1 and 2, the two dummy pilot signals should not cause interference at the mobile terminals 16.

However, to the extent that the estimated channel coefficients in the starting rows do not match the actual propagation channel characteristics to the real mobile terminals 16, the supplemental row values will not cause the desired cancellation of the dummy pilot signals at the mobile terminals 16. Thus, the extent to which the dummy pilot signals interfere with reception at the real receivers may be taken as an indicator of how well the channel estimates for the real receivers match actual channel conditions.

On this basis, the mobile terminals 16 may provide an indication of such interference by providing the loop back signals discussed above to the network 10. Correlation operations between the loop back signals and the pilot and information signals allows the network 10 to determine the extent of pilot signal interference, and thus change or update the channel estimates for the real receivers to reduce such interference.

Thus, dummy signals transmitted in accordance with the above discussion permit determination of the downlink channel estimates for the propagation paths between the involved transmitters and the wireless receivers being served by those transmitters. The signals being transmitted to a reduced number of mobile terminals 16 (i.e., N transmitters transmitting to M receivers where N>M) may be pre-filtered for transmission such that the dummy signals allowing channel estimation cause no interference or pilot pollution at the real mobile terminals 16.

Note that the transmit processor 18, the loop back processor 52, and various other portions of the network 10 are subject to much variation in terms of implementation. Generally, the transmit processor 18 and loop back processor 52 comprise one or more signal processors, or comprise portions of other network processing systems within the network 10. For example, if the MSC 19 contains the transmit processor 18, it may be that the transmit processor 18 comprises processing resources within the MSC 19. It may be that the loop back processor 52 is formed as part of the transmit processor 18, such that a central processing system of the network 10 determines transmit pre-filtering based on receiving and processing loop back signal information.

Of course, the present invention is in general subject to much variation, and the above examples should be considered as exemplary rather than limiting. Indeed, the present invention is limited only by the following claims and the reasonable equivalents thereof.

What is claimed is:

1. A method of estimating propagation channels between two or more transmitters and a fewer number of receivers, the method comprising:
   transmitting information signals for said receivers jointly from said two or more transmitters, said information signals pre-filtered based on propagation channel estimates;
   transmitting at least one dummy pilot signal jointly from said transmitters, said at least one dummy pilot signal pre-filtered based on said propagation channel estimates; and
   receiving loop back signals from said receivers having dummy pilot signal interference that is dependent on the accuracy of said propagation channel estimates; and
   revising said propagation channel estimates based on said loop back signals.

2. The method of claim 1, wherein revising said propagation channel estimates based on said loop back signals comprises:
   correlating said loop back signals with said information signals to determine an amount of dummy pilot signal interference; and
   adjusting said propagation channel estimates to reduce said dummy pilot signal interference in said loop back signals.

3. The method of claim 1, wherein said propagation channel estimates comprise propagation channel estimate vectors relating each said receiver to said transmitters, and further comprising determining a supplemental channel estimate vector for each one of said at least one dummy pilot signal, such that said supplemental channel estimate vectors are orthogonal to said channel estimate vectors.

4. The method of claim 3, wherein pre-filtering said at least one dummy pilot signal based on said propagation channel estimates comprises pre-filtering said at least one dummy pilot signal using said supplemental channel estimate vector.

5. The method of claim 1, wherein transmitting information signals for said receivers jointly from said transmitters comprises transmitting an information signal for one receiver jointly from two transmitters.

6. The method of claim 5, wherein transmitting an information signal for one receiver jointly from two transmitters comprises transmitting the information signal on two transmit polarizations, wherein each said polarization propagates through a different propagation channel to said receiver.

7. The method of claim 1, wherein transmitting information signals for said receivers jointly from said transmitters comprises transmitting a combination of information signals for a first plurality of receivers from each one in a larger plurality of transmitters.

8. The method of claim 7, wherein said transmitters are radio base stations, and wherein said information signals are pre-filtered to form a combined transmit signal for each one of said transmitters, said combined transmit signals representing differently weighted combinations of said information signals based on said pre-filtering using said propagation channel estimates.

9. The method of claim 8, further comprising pre-filtering said at least one dummy pilot signal, such that said combined transmit signals further comprise a weighted version of said at least one dummy pilot signal.

10. A wireless communication network comprising:
a transmit processor operative to form a number of transmit signals as weighted combinations of at least one individual information signals and at least one dummy signal by pre-filtering the information signals and the at least one dummy signal using propagation channel estimates;
a number of transmitters operative to transmit said transmit signals;
a loop back signal processor operative to determine interference at one or more wireless receivers receiving said transmit signals caused by transmission of said at least one dummy signal based on receiving loop back signals from the one or more wireless receivers;
wherein said transmit processor adjusts said propagation channel estimates to reduce interference caused by transmitting said at least one dummy signal based on said determined interference.

11. The wireless communication network of claim 10, wherein said transmitters comprise a number of antenna elements on a transmitting antenna, at least one of said antenna elements having a different polarization than another antenna element.

12. The wireless communication network of claim 10, wherein said transmitters comprise a number of radio base stations.

13. The wireless communication network of claim 10, wherein said transmit processor is further operative to form a channel estimate matrix comprising the propagation channel estimates.

14. The wireless communication network of claim 13, wherein said transmit processor is further operative to form said channel estimate matrix as a channel estimate vector for each of the at least one information signals, and a channel estimate vector for each one of the at least dummy signal, wherein the channel estimate vectors for the information signals characterize actual propagation channels from each transmitter to a wireless receiver for which the information signal is intended.

15. The wireless communication network of claim 14, wherein the transmit processor is further operative to form the channel estimate vectors for the at least one dummy signal orthogonal to the channel estimate vectors for the one or more information signals, such that if the channel estimate vectors for the information signals substantially match the actual propagation channels, the at least one dummy signal will cancel at each wireless receiver receiving the transmit signals.

16. The wireless communication network of claim 10, wherein said transmit processor comprises one or more signal processors operative to perform said pre-filtering.

17. The wireless communication network of claim 10, wherein said loop back processor comprises one or more signal processor operative to determine said interference at said receivers by correlating said loop back signals with said dummy signals and said information signals.

18. A wireless network processing system in a wireless communication network wherein a number of transmitters jointly transmit to a lesser number of receivers, the wireless network processing system comprising:
a loop back signal processor to determine interference in a loop back signal from a wireless receiver caused by a dummy pilot signal being transmitted by said transmitters; and
a transmit processor to adjust a transmit pre-filter being applied by said transmit processor to an information signal for the wireless receiver, and being applied to said dummy pilot signal, based on said determined interference;
wherein said loop back signal processor and said transmit processor cooperate to make propagation channel estimates on which said transmit pre-filter is based on, to substantially match actual propagation channel characteristics between said transmitters and the wireless receiver by adjusting said propagation channel estimates to reduce said determined interference.

* * * * *